United States Patent [19]
Riley et al.

[11] Patent Number: 5,581,064
[45] Date of Patent: Dec. 3, 1996

[54] AUTOMATED COUPON PROCESSING SYSTEM EMPLOYING COUPON WITH IDENTIFYING CODE AND CHOSEN SECOND IDENTIFYING CODE UNIQUELY IDENTIFYING THE COUPON

[75] Inventors: Roger K. Riley, Shortsville; Stuart C. Gillow, Farmington, both of N.Y.

[73] Assignee: Pennsylvania Food Merchants Association, Camp Hill, Pa.

[21] Appl. No.: 332,729

[22] Filed: Nov. 1, 1994

[51] Int. Cl.$^6$ .................................................. G06K 15/00
[52] U.S. Cl. ............................................ 235/383; 235/462
[58] Field of Search ................................. 235/383, 462, 235/463; 364/478

[56] References Cited

U.S. PATENT DOCUMENTS

| | | | |
|---|---|---|---|
| 3,959,624 | 5/1976 | Kaslow | 235/463 |
| 4,355,372 | 10/1982 | Johnson et al. | 364/900 |
| 4,554,446 | 11/1985 | Murphy et al. | 235/487 |
| 4,752,675 | 6/1988 | Zetmeir | 235/375 |
| 4,825,045 | 4/1989 | Humble | 235/383 |
| 4,908,761 | 3/1990 | Tai | 364/401 |
| 5,021,640 | 6/1991 | Muroi | 235/462 |
| 5,025,139 | 6/1991 | Halliburton, Jr. | 235/379 |
| 5,056,019 | 10/1991 | Schultz | 364/405 |
| 5,128,520 | 7/1992 | Rando et al. | 235/375 |
| 5,128,527 | 7/1992 | Kawai | 235/462 |
| 5,198,649 | 3/1993 | Brooks | 235/462 |

FOREIGN PATENT DOCUMENTS 7800261 1/1978 France .

*Primary Examiner*—Donald T. Hajec
*Assistant Examiner*—Karl Frech
*Attorney, Agent, or Firm*—Popham, Haik, Schnobrich & Kaufman, Ltd.

[57] ABSTRACT

An automated coupon processing system inputs information from a manufacturer coupon, discerns a first identifying code from the coupon, correlates the first identifying code with one or more second identifying codes, and chooses a particular one of the second identifying codes, where the first identifying code and the chosen second identifying code uniquely identify the coupon. The system can prompt an operator to select one of the second identifying codes or to enter a coupon expiration date that corresponds to one of the second identifying codes. Coupons information can be entered using a bar code reader, an OCR scanner, a combination bar code reader/OCR scanner, and/or manual entry.

26 Claims, 5 Drawing Sheets

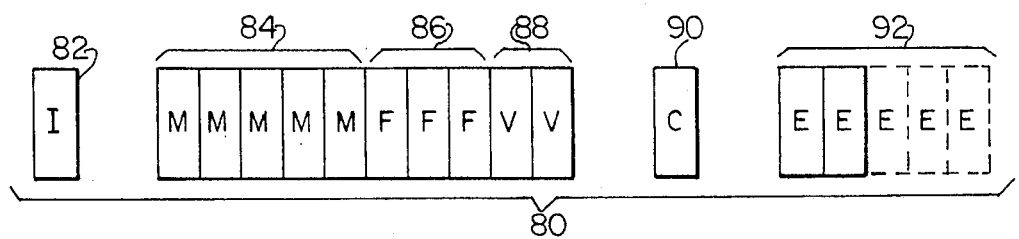
FIG. 3
PRIOR ART
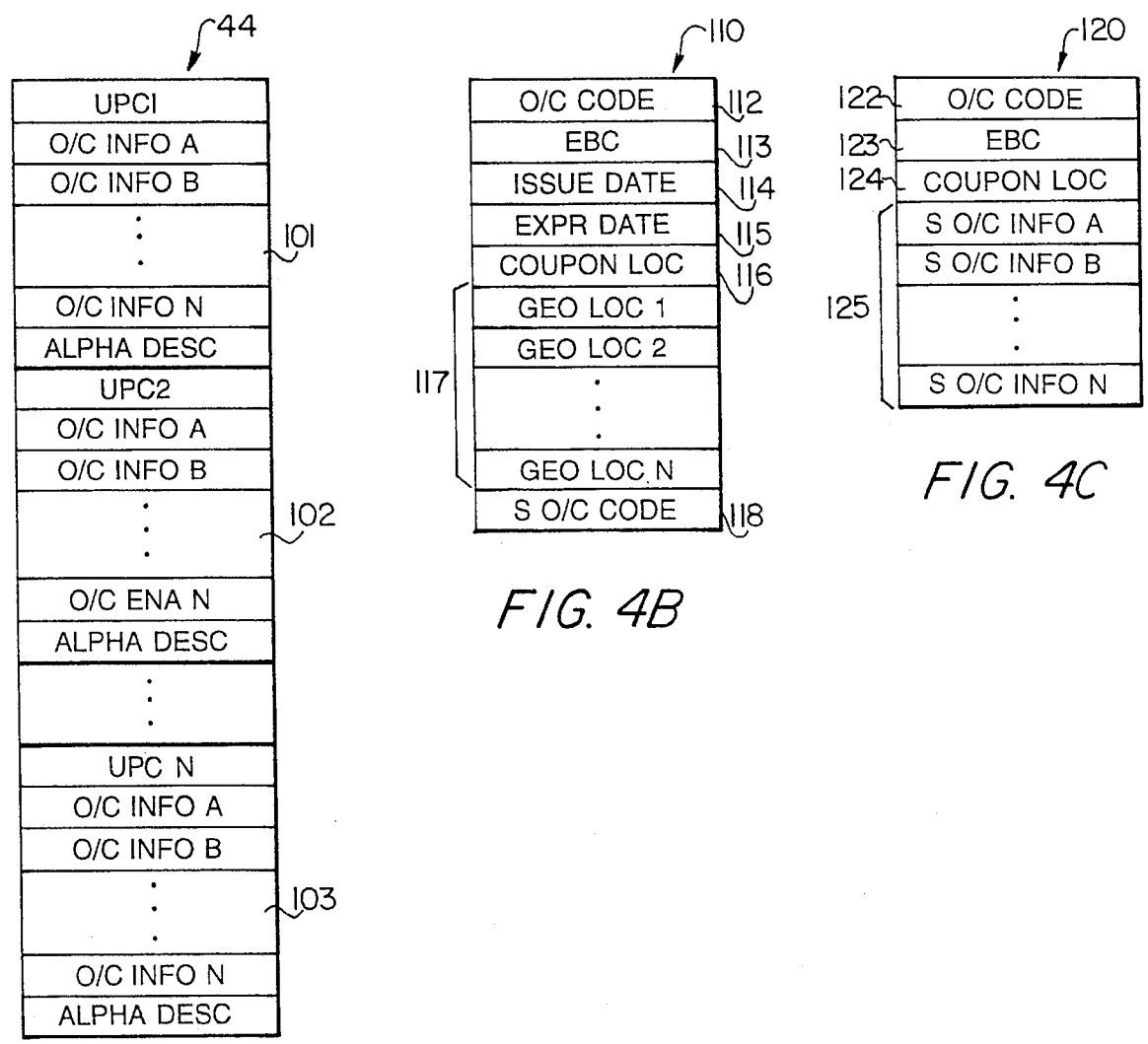
FIG. 4B
FIG. 4C
FIG. 4A

FIG. 7

```
                              Search            Coupon-1 of 3      210
LINE                                            Last Path=
Search mode=
                          212
        UPC 1111112050
                                        Category SOAP DETERGENT
        Expiration Date  09/30/94   213 Item LAUNDRY ANY
                                        Description SURF ASST Size 1  Units ANY       Qty 1      Offer___/FR/___  Value .50
   218                     214        216                          220
        Line #   Campaign Code   Exp. Date   2nd Campaign Code
        1.       40994           7/31/94
        2.       40997           10/31/94
        3.       41017           11/30/94
        4.                       _/_/_
        5.                       _/_/_
        6.                       _/_/_
        7.                       _/_/_
        8.                       _/_/_

Select the correct coupon match, enter the line number and <enter>.
To enter new campaign codes select next open line #, type info and <enter>
```

FIG. 8

```
                          Add Coupon
CONSOLE                                     Coupon - 1 of 2      230

232
        UPC 1111111050
                                        Category SOAP DETERGENT
        Expiration Date  09/30/94   233 Item LAUNDRY ANY
                                        Description WISK ANY Size  1    Units  ANY     Qty 1    Offer___/FR/___  Value .50

234                  236       238
        Market      Type    Campaign Code   Location   2nd Code
                            40017           2
                            40022           2
        4. Roch. N.Y. __    40039           2

Select Menu Choice:         240
        A'dd to DB     E'dit Current    C'lear     Q'uit
```

AUTOMATED COUPON PROCESSING SYSTEM EMPLOYING COUPON WITH IDENTIFYING CODE AND CHOSEN SECOND IDENTIFYING CODE UNIQUELY IDENTIFYING THE COUPON

BACKGROUND OF THE INVENTION

1. Field of the Invention

The present invention relates to a system for identifying and processing manufacturer coupons. More specifically, the invention relates to an automated system that uses a computer processor to obtain and compile data from a plurality of manufacturer coupons.

2. Related Art

Manufacturer coupons are used by consumers to decrease the price paid for items at retail establishments. Each coupon has printed thereon an alphanumeric identification of a particular item, a description and an amount by which to decrease the retail price of the item, an expiration date, and a U.P.C. (Universal Product Code), or other code, that identifies the coupon. The consumer purchases the item and presents the coupon to the merchant who decreases the price of the item by the amount shown on the coupon or provides "free goods" (e.g., buy one, get one free). The merchant may scan the U.P.C. or other codes printed on the coupon so that the merchant's checkout system automatically decrease the price paid by the consumer.

The merchant can submit the coupon directly to the manufacturer for reimbursement of the amount shown on the coupon (plus a nominal handling fee). However, due to the large volume and diversification of coupons handled by most merchants and due to the large number of manufacturers, it is often more efficient to employ a coupon processing service.

A coupon processing service receives a batch of coupons from a particular merchant and/or merchant store, sorts the coupons according to manufacturer, and calculates the amount of money due to the merchant from each manufacturer. This process is fairly labor intensive. An operator at the coupon processing service will manually handle each coupon, scan or manually enter the U.P.C. code, and sort the coupons by manufacturer. A computer processor can be connected to the U.P.C. scanner and used to calculate the amount due to the merchant from each manufacturer.

After being processed, the coupons can be returned to the manufacturers or their agents for confirmation of the amounts and/or further marketing studies. The manufacturer can also have printed on the coupon optional offer/campaign codes which can identify the source of the coupon and thus facilitate marketing studies by the manufacturer. The manufacturer can use the offer/campaign code information to determine the effectiveness of their coupon offers in various markets. Determining the various offer/campaign codes on the coupons involves reprocessing of the coupons in a manner similar to the original redemption processing. That is, each coupon must be manually handled and examined to determine the offer/campaign code printed thereon. Processing the coupons a second time is relatively labor intensive and expensive.

U.S. Pat. No. 4,166,540 to Marshall discloses a coupon processing system where coupons are sorted according to the U.P.C., physical properties, and images on the face of the coupon. However, Marshall does not disclose ascertaining the offer/campaign codes from the coupon.

It is desirable to simplify coupon processing by minimizing the amount of handling required and ascertaining marketing data from coupons without appreciably increasing the cost of processing the coupons.

SUMMARY OF THE INVENTION

According to the present invention, an automated coupon processing system inputs information from a manufacturer coupon, discerns a first identifying code from the coupon, correlates the first identifying code with one or more second identifying codes, and chooses a particular one of the second identifying codes, where the first identifying code and the chosen second identifying code uniquely identify the coupon. The system can prompt an operator to select one of the second identifying codes or to enter a coupon expiration date that corresponds to one of the second identifying codes. The system can input the information by using one of: a bar code scanner, an optical character recognition scanner, a combination bar code scanner/optical character recognition scanner and manually.

According further to the present invention, the system can read a code on a face of said coupon. The code is a bar code which can be a U.P.C. or E.A.N. bar code. The bar code can also include information for selecting the second identifying code. The system can maintain a computer data file containing records indexed by the first identifying code. The computer data file can include an alpha description of a product corresponding to the manufacturer coupon.

According further to the present invention, the system can also ascertain coupon values from the first identifying code, ascertain marketing data from the second identifying code, can total coupon values, and can accumulate marketing data. The second identifying code can be an offer/campaign code. The system can be implemented using a computer processor.

The automated coupon processing system allows fast, efficient, and cost effective processing of coupons. Coupon values can be totaled and marketing data can be accumulated in one operation. The operator can be prompted to choose one of a plurality of secondary codes, thus further simplifying operation of the system. The system can take advantage of existing U.P.C. codes currently used on coupons and can also process coupon codes adopted in the future, such as E.A.N. codes or other codes not yet defined.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 1 illustrates an automated coupon processing system according to the present invention.

FIG. 2 is a flow diagram illustrating operation of the automated coupon processing system according to the present invention.

FIG. 3 shows a universal product code that can be found on a manufacturer coupon.

FIG. 4A shows data that is used by the automated coupon processing system.

FIGS. 4B and 4C show in detail some of the fields associated with each record of data used by the automated coupon system.

FIG. 7 shows a screen provided by the system to the operator during a coupon search process.

FIG. 8 shows a screen provided by the system to the operator during an add coupon process.

DETAILED DESCRIPTION OF THE PREFERRED EMBODIMENTS

Figure 6:
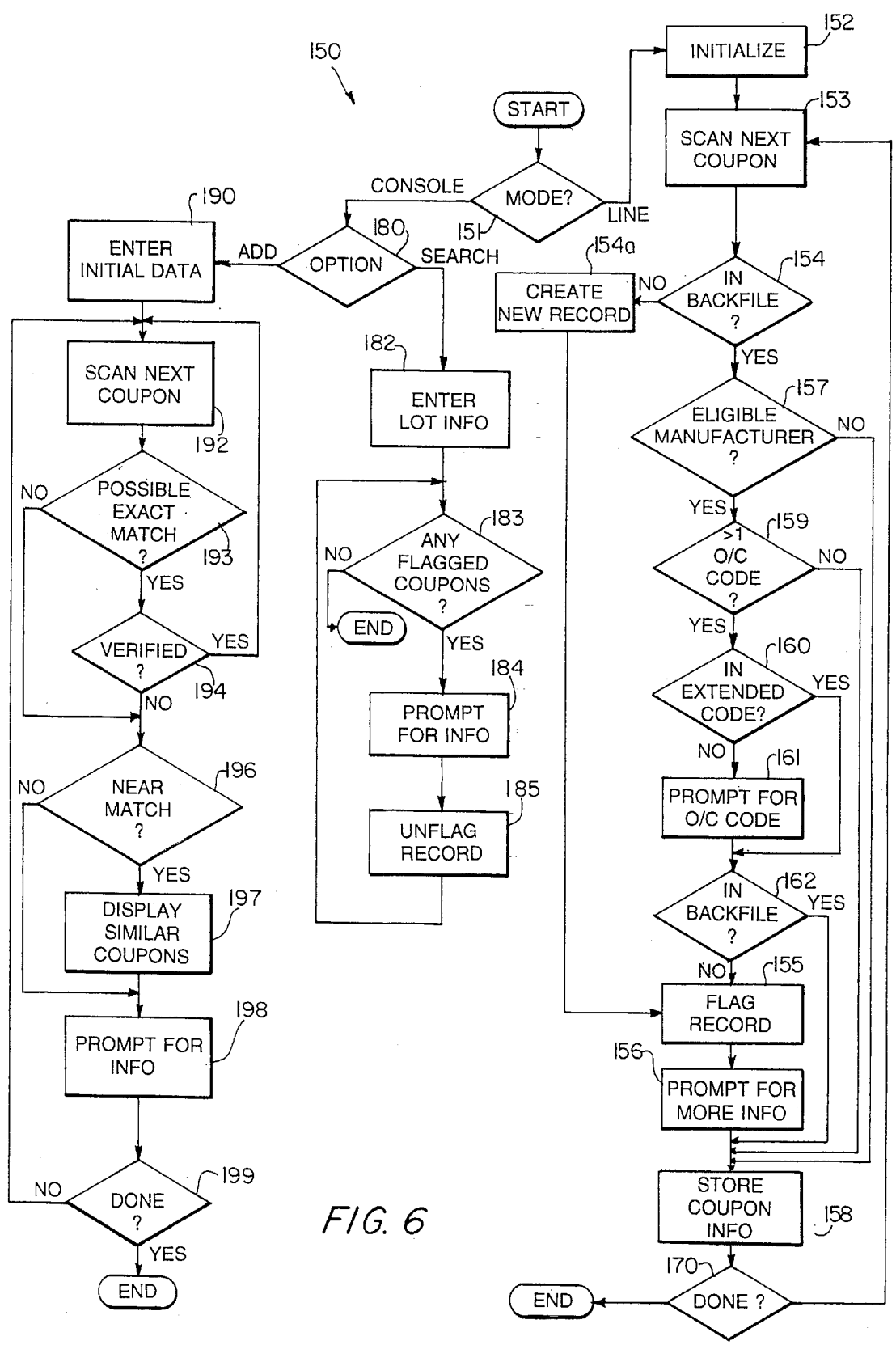
FIG. 6 is a flowchart illustrating the flow of the automated coupon processing system software.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

Referring to FIG. 1, an automated coupon processing system 30 includes a computer processor 32 and a Universal Product Code (U.P.C.) scanner 34. Optionally, the system 30 can also include either a stand-alone optical character recognition (OCR) scanner 36 or a single device 37 that is both a U.P.C. scanner and an OCR scanner. The U.P.C. scanner 34 and the OCR scanner 36 are used to examine manufacturer coupons and provide information indicative thereof to the computer processor 32. The U.P.C. scanner 34 can be any one of a variety of commercially available U.P.C. scanners such as MS 700 or MS 860 made by Metrologic Inc. of Blackwood, N.J. The OCR scanner 36 can be any one of a variety of conventional, commercially available, OCR scanners. Similarly, the combination bar code/OCR scanner 37 can be any one of a variety of conventional commercially available models, such as those produced by Optowand Inc. of Irving, Tex. The U.P.C. scanner 34 and the OCR scanner 36 or the combination device 37 are electrically connected to the computer processor 32 in a conventional manner.

The computer processor 32 can be any one of a variety of conventional, commercially available, computer processors suitable for providing the functionality described herein, such as a 486 DX4-100 computer manufactured by AST Corporation of Fountain Valley, Calif. The computer processor 32 includes a processor 38, a monitor 40, and a keyboard 42. *The computer processor 32 also has storage 43, such as a conventional hard disk drive, containing backfile data 44, redemption data 46, and marketing data 48. Alternatively, the storage 43 can be provided as multiple units with any one of the backfile data 44, redemption data 46, and marketing data 48 stored in separate storage units from the others.

*Although the current invention is using a keyboard 42 it will be appreciated that the invention can be practiced using other types of computer input devices including voice, touch screen, touch pad or any other conventional device.

The backfile data 44 contains data indicative of coupon information that may be accessed for processing. The processor 38 uses the information from the backfile 44 to process scanned coupons and write redemption information to the redemption data 46 and marketing information to the marketing data 48. If a coupon that is not stored in the backfile 44 is scanned, the operator will be prompted to enter the appropriate data at the keyboard 42 so that the coupon information can be stored in a temporary file that is later copied into the backfile 44. The backfile data 44, the redemption data 46, and the marketing data 48 are described in more detail hereinafter.

Referring to FIG. 2, a flow diagram 50 illustrates operation of the automated computer processing system 30. Processing begins at a first step 52 where the operator scans the U.P.C. code of a coupon using the U.P.C. scanner 34 or the combination U.P.C./OCR scanner 37. Following the step 52 is a step 54 where the processor 38 determines if the item scanned by the operator is in fact a valid manufacturer coupon. Recognizing if an item is a valid manufacturer coupon is described in more detail hereinafter. If the item scanned by the operator is not a valid manufacturer coupon, control transfers from the step 54 to step 55 where the item is rejected and processing is terminated. That is, for an item that is not a valid manufacturer coupon, no further processing is performed. After the item has been rejected at the step 55, the operator is prompted to scan the next item.

If the item scanned at the step 52 is a valid manufacturer coupon, then control transfers from the step 54 to a step 56 where a test is made to determine if the coupon information is stored in the backfile data 44. The backfile data 44 is indexed by coupon U.P.C. If the U.P.C. obtained at the scanning step 52 is not found in the backfile data 44, then control transfers from the step 56 to a step 58 where the system acquires the coupon information. The step 58 can include having the computer processor 32 prompt the operator, via the monitor 40, to enter relevant information from the face of the coupon at the keyboard 42. Optionally, the operator can be prompted to run the coupon through the OCR scanner 36 to transfer the image to the processor 38 which would then process the image to obtain the relevant additional coupon information. Following the step 58 is a step 60 where the information for the previously unrecognized coupon is stored in a temporary file that is eventually copied into the backfile data 44, as described in more detail hereinafter.

If it is determined at the test step 56 that the U.P.C. for the coupon scanned at the step 52 is already stored in the backfile 44, then control transfers from the step 56 to a step 62. That is, if the relevant coupon information is already found in the backfile data 44, then the steps 58 and 60, which relate to acquiring and storing the data for the coupon, are not performed.

It is possible to have more than one type of coupon associated with a single coupon U.P.C. A particular coupon U.P.C. can have associated therewith multiple offer/campaign codes provided by the manufacturer. For example, a coupon offering an amount off of the price of a particular product can have two distinct offer codes: the first offer code associated with one geographic location and the second offer code associated with a second geographic location. The manufacturer would use the distinguishing offer/campaign codes to compile data relating to the effectiveness of the coupon in the different geographic locations. Note that it is also possible for the manufacturer to use two or more different offer/campaign codes in the same geographic location.

At the test step 62, the processor 38 uses the backfile 44 to determine if the U.P.C. number scanned at the step 52 has more than one offer/campaign code associated with the U.P.C. If so, then the coupon is not unique. That is, the particular U.P.C. is associated with more than one type of coupon. In that case, control passes from the test step 62 to a step 64 where the system 30 acquires additional information in order to uniquely identify the coupon. Acquiring additional information can include prompting the operator to enter the offer/campaign code via the keyboard 42. Optionally, the operator can be prompted to run the coupon through the OCR scanner 36 which provides an image to the processor 38 from which the processor 38 can determine the unique offer/campaign code. It is also possible to provide the operator with a prompt of possible codes and have the operator select from one of the prompted codes. Entering the offer/campaign codes is described in more detail hereinafter.

If it is determined at step 62 that the coupon is unique or if the system 30 has acquired the necessary additional coupon information at the step 64, then operation continues at a step 66 where the system 30 stores the marketing data 48. Following the step 66 is a step 68 where the system 30 stores redemption data 46. Obtaining and storing the redemption and marketing data is described in more detail hereinafter.

Referring to FIG. 3, a U.P.C. bar code 80 for Industry Standard System V bar code is illustrated. The industry standards are promulgated by the Uniform Code Council of Dayton Ohio. Each individual rectangle of the illustration represents a particular bar code digit.

The U.P.C. bar code 80 includes a first digit 82 that identifies the bar code as a U.P.C. bar code on a manufacturer coupon. By convention, this digit is the number "5". If the system determines that the digit 82 is not the number "5", then the system 30 deems the scanned item not to be a manufacturer coupon.

Five digits 84 following the first digit 82 indicate the manufacturer of the product shown on the coupon. A unique combination of five digits is assigned to each manufacturer by the Uniform Code Council. Following the manufacturer digits 84 are three digits 86 that are assigned by the manufacturer to represent a family code for the product. The family code is used by the manufacturer to identify the product. For example, a manufacturer that provides ten different products can assign a unique family code to each of the ten different products. A manufacturer can also assign the same family code to a particular group of products. Note that, by convention, zeros is the least significant digits of the family code on the coupon match any digit so that, for example, a coupon with a family code of 110 will match any manufacturer's family code between 111 and 119. Similarly, a coupon with a family code of 200 will match any manufacturer's family code between 201 and 299.

Following the family code digits 86 are value code digits 88 which represent the value of the coupon. The value of the coupon 88 is the amount of the purchase price that is subtracted by the merchant when the consumer redeems the coupon. For example, if the coupon is for fifteen cents off a particular product, then the value digits 88 would be "1" and "5". Following the value digits 88 is a check digit 90 which is used by the U.P.C. scanner to verify that the other digits 82, 84, 86, 88 were read properly by the scanner.

Optionally, the check digit 90 can be followed by extended digits 92 which further identify the coupon. Manufacturers currently taking advantage of the extended digit field 92 use either two or five digits. These extended digits can be read by the U.P.C. scanner 34 and, depending on the convention used by the manufacturer, can uniquely identify the offer/campaign codes used by the manufacturer. That is, a manufacturer can encode the offer/campaign code in the extended digits 92. Accordingly, the step 64 in the flow diagram 50 of FIG. 2, where additional information is required in order to differentiate the coupon from other coupons having the same U.P.C., can include examining the extended digits to uniquely identify the coupon.

The use of the extended digits 92 to encode the offer/campaign code is at the discretion of the manufacturer. As described in more detail hereinafter, the backfile data 44 contains information for each U.P.C. code indicating whether the manufacturer uses the extended digits 92 and whether the extended digits 92 uniquely identify the offer/campaign codes.

The backfile data 44 is a database containing a plurality of records indexed by the U.P.C. of each coupon. Associated with each record is a plurality of offer/campaign codes that can be present on each coupon. Each offer/campaign code can have associated therewith one or more geographic locations and/or markets where the coupon was dropped (i.e., provided to consumers), an issue date, an expiration date, and the physical location on the coupon where the offer or campaign code can be found. Also, it is possible for a particular offer/campaign code to have a secondary offer/campaign code associated therewith. In that case, each of the secondary offer/campaign codes can be further associated with one or more geographic locations, issue and expiration dates, and physical location on the coupon where the secondary offer or campaign code can be found.

Referring to FIG. 4A, a schematic representation of the data stored in the backfile 44 shows a plurality of records 101–103, each of which corresponds to a unique U.P.C. As discussed above, each U.P.C. can have one or more offer/campaign codes associated therewith, which is represented in FIG. 4A as O/C Info A, O/C Info B . . . O/C Info N. Note that it is possible that a particular U.P.C. would have no offer/campaign codes associated with it. In that case, the U.P.C. number uniquely identifies the coupon. Also shown in FIG. 4A, each unique U.P.C. also has an alpha description associated therewith. The alpha description is described in more detail hereinafter.

Referring to FIG. 4B, a schematic representation 110 shows the data stored in each O/C Info element of FIG. 4A. That is, the diagram 110 shows the data stored in O/C Info A, O/C Info B, etc.

As shown in FIG. 4B, each O/C Info record includes the offer/campaign code 112, an element 113 indicating whether the offer/campaign code is found in the extended bar code 92 shown in FIG. 3, an issue date 114 associated with the offer/campaign code 112, an expiration date 115 associated with the offer/campaign code 112, an indication 116 of the location on the coupon where the offer/campaign code 112 can be found, and one or more geographic marketing locations 117 that are associated with the offer/campaign code 112. The record 110 also includes an indicator 118 as to whether there is one or more secondary offer/campaign codes associated with the offer/campaign code 112. It is possible for a single offer/campaign code to have one or more secondary offer/campaign codes associated therewith.

The extended bar code element 113 indicates whether the offer/campaign code 112 is found in the extended bar code 92 shown in FIG. 3. At the discretion of the manufacturer, the offer/campaign code 112 can be included in the extended bar code 92. As discussed in more detail hereinafter, this simplifies processing by allowing the system to read and verify the extended bar code 92 and automatically ascertain the offer/campaign code.

The issue date 114 and expiration date 115 indicate the issue and expiration dates of the coupon, respectively. This information is useful for marketing purposes and can also be used during line processing to reject coupons that have passed an "age after expiration data" threshold which can be uniquely set by manufacturer, retail store, etc.

The coupon location 116 indicates the physical location of the offer/campaign code 112 on the coupon. This information can be useful in two respects: It is possible to use the location to prompt the operator to look at a certain part of the coupon to quickly ascertain the offer/campaign code. Alternatively, this information can be used by the OCR scanner 36 (or combination U.P.C. scanner/OCR scanner 37) to automatically scan the coupon and use optical character recognition on the part of the scanned image where the offer/campaign code is located to automatically ascertain the offer or campaign code.

The one or more geographic locations 117 associated with the offer/campaign code 112 can be used by the system 30 to compile the marketing data 48. Also, as described in more detail hereinafter, the geographic locations 117 can be used to facilitate coupon processing.

The secondary offer/campaign code 118 is a field that indicates whether or not the offer/campaign code 112 has associated therewith one or more secondary offer/campaign codes. If so, then a coupon is uniquely identified by the combination of the primary offer/campaign code 112 and the secondary offer/campaign code 118. If the offer/campaign code 112 has associated therewith one or more corresponding secondary offer/campaign codes, then each of the secondary offer/campaign codes is associated with additional information similar to the information shown in the record 110. That is, each secondary offer/campaign code can be associated with additional data such as issue dates, expiration dates, physical location on the coupon of the code, geographic locations, etc.

Referring to FIG. 4C, a record 120 shows the offer or campaign code data for an offer/campaign code having multiple secondary offer/campaign codes associated therewith. The record 120 includes a primary offer/campaign code 122, an indicator 123 as to whether the offer/campaign code is found in the extended bar code, an indicator 124 that specifies the physical location on the coupon where the secondary offer/campaign code can be found, and one or more records 125 associated with the secondary offer/campaign code. The relationship between the U.P.C., the offer or campaign code, and the secondary offer/campaign code is described in more detail hereinafter.

Figure 5:
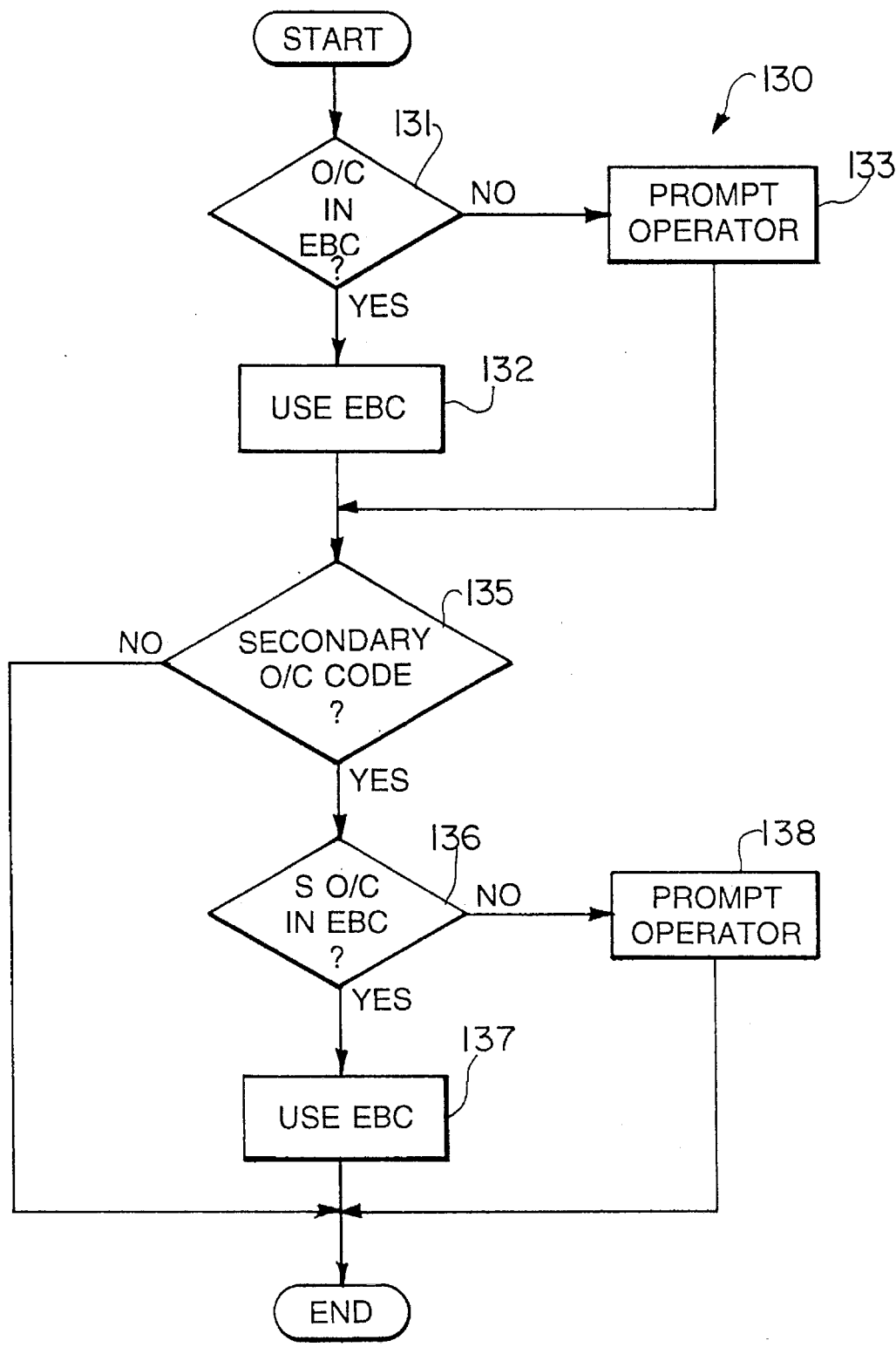
FIG. 5 is a flow diagram illustrating in detail operation of a portion of the automated coupon processing system.
Figure 6:
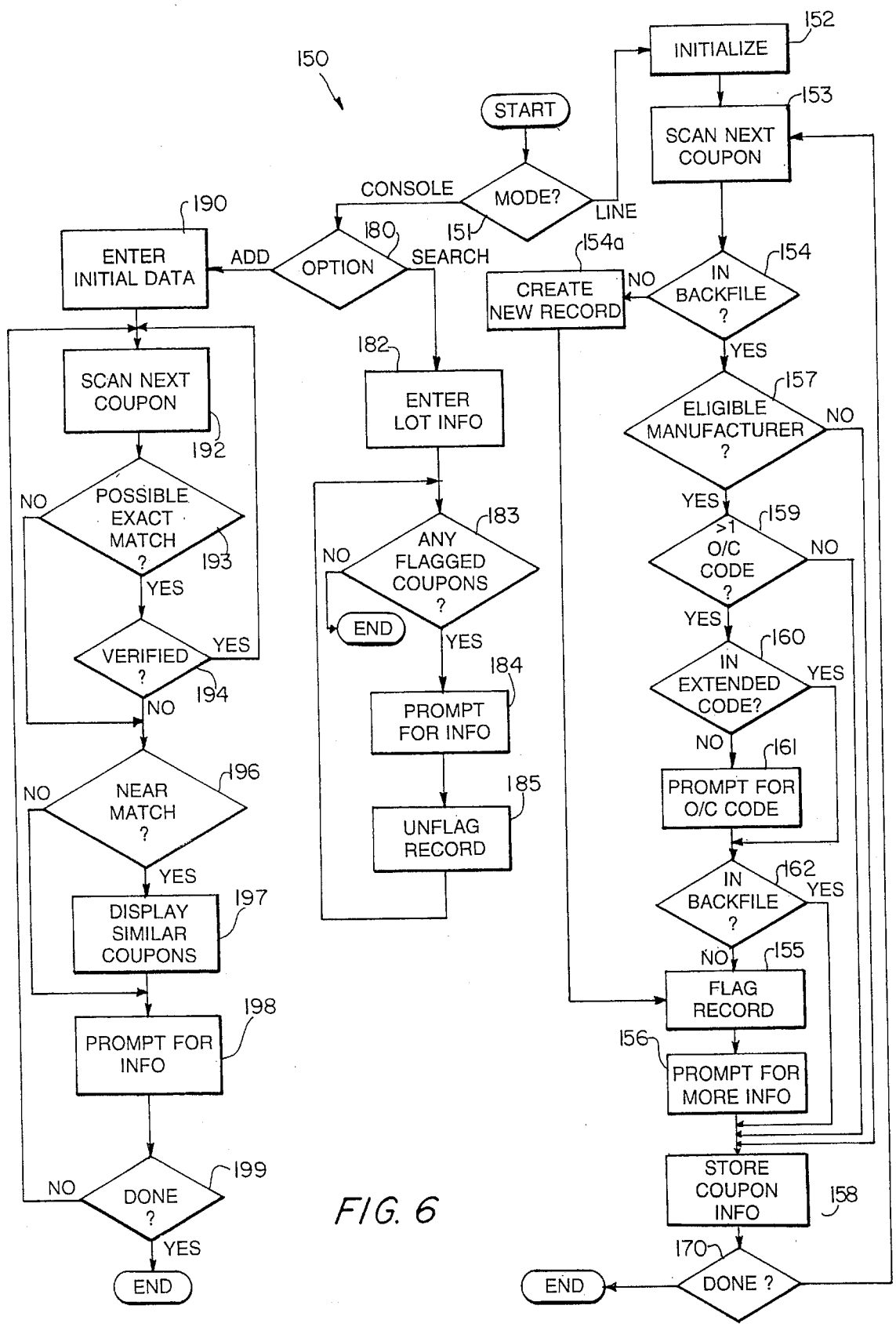

Referring to FIG. 5, a flow diagram 130 illustrates in detail the step 64 of FIG. 2 where additional information is acquired for a coupon having a U.P.C. that is associated with more than one offer/campaign code. Note that, for a coupon having a single offer/campaign code or no offer/campaign code, the step 64 of FIG. 2 is not executed since the coupon would be identified as unique by the U.P.C. at the test step 62 of FIG. 2.

At a first step 131, a test is performed to determine if the offer/campaign code is found in the extended bar code. If so, control passes from the step 131 to a step 132 where the extended bar code is used to identify the offer/campaign code of the coupon. Otherwise, if the offer/campaign code is not in the extended bar code, control passes from the step 131 to a step 133 where the operator is prompted to enter the offer/campaign code. Prompting the operator to enter the offer/campaign code is described in more detail hereinafter. Following either the step 132 or the step 133 is a step 135 where a test is made to determine if the offer/campaign code has associated therewith a secondary offer/campaign code. If not, then processing is complete. That is, if there is no secondary offer/campaign code associated with the coupon, then the coupon is uniquely identified by the offer/campaign code ascertained at the step 132 or the step 133.

If at the step 135 it is determined that the offer/campaign code has a secondary offer/campaign code associated therewith, control passes from the step 135 to a step 136 to test if the secondary offer/campaign code is found in the extended bar code. If so, then control passes from the step 136 to a step 137 where the extended bar code is used to identify the secondary offer/campaign code. Otherwise, control passes from a step 136 to a step 138 where the operator is prompted to enter the secondary offer/campaign code. Prompting the operator to enter the secondary offer/campaign code is described in more detail hereinafter.

Referring to FIG. 6, a flow chart 150 illustrates in detail operation of the software for the automated coupon processing system 30. The software can be written in any appropriate computer language, such as C++, available from Borland Inc. of Scotts Valley, Calif.

At a first step 151, the operator selects whether to operate the automated coupon processing system 30 in the console mode or the line mode. The line mode is similar to the processing discussed above wherein an operator scans coupons received from various merchants in order to accumulate marketing and redemption data. In the console mode, a supervisor enters data into the backfile 44 relating to new coupons or to previously processed line mode coupons needing additional information.

If at the step 151 the operator selects the line mode, then control passes from the step 151 to a step 152 where the operator enters initializing data for processing a batch of coupons from a particular merchant. The initializing data includes the primary market code along with optional second and/or third market codes for the particular merchant. The market codes identify the likely source of the coupon. During processing, when the operator is prompted for offer/campaign codes, only those offer/campaign codes corresponding to the markets entered at the initialization step 152 are displayed. Note that there are currently as many as sixty different marketing areas in the United States, but that a coupon is very likely to be redeemed near the location where the coupon was originally dropped.

Other initializing information entered at the step 152 includes the name of the merchant, the merchant store number, the merchant week ending date, the processing lot number, and the allowable expiration date. The operator can also enter a list of eligible manufacturers at the initialization step 152. Eligible manufacturers are those for which the operator will be prompted for offer/campaign codes. If no eligible manufacturers are entered, then the system 30 treats all manufacturers as eligible and always prompts the operator for appropriate campaign or offer codes.

Following the step 152 is a step 153 where line processing begins by having the operator scan the U.P.C. of a coupon. Note that items that are identified as not being coupons are rejected at the step 153 and the operator is prompted to scan the next coupon.

Following the step 153 is a test step 154 which determines if the U.P.C. scanned at the step 153 corresponds to a record stored in the backfile 44. If not, then control passes from the step 154 to step 154a where a new record is created in a temporary file that will eventually be copied into the backfile 44. The new record contains the scanned U.P.C. Following the step 154a is a step 155 where the new record is flagged for further processing by supervisory personnel at a later time in order to verify and complete the record and to copy the information from the temporary file into the backfile 44. Following the step 155 is a step 156 where the operator is prompted for information relating to the coupon. The operator enters a minimal amount of information, such as the offer/campaign code and/or expiration date, at the step 156 so that coupons with the same U.P.C. in the batch being processed will pass through without being flagged.

If at the step 154 the U.P.C. is found in the backfile, control transfers to a step 157 where the U.P.C. of the scanned coupon is examined to determine if the U.P.C. corresponds to an eligible manufacturer entered at the step 152. If not, then control passes from the step 157 to a step 158 where the information for the coupon is stored.

If at the test step 157 the U.P.C. corresponds to that of an eligible manufacturer, then control passes from the step 157 to a test step 159 to determine if the U.P.C. scanned at the step 153 has multiple offer/campaign codes associated therewith. If not, then the coupon is unique by virtue of its U.P.C. code alone and control passes from a step 159 to the step 158 where the information for the coupon is stored. Note that at the step 159, the only offer/campaign codes that are examined are those that correspond to the markets entered at the initialization step 152. If there is only one offer/campaign code associated with a particular U.P.C. for the market or markets entered at the step 152, then the coupon is deemed not to have multiple offer/campaign codes, even if the coupon has other offer/campaign codes associated with it in different markets. This can be illustrated by the following example:

Suppose a coupon having a particular U.P.C. has a first offer code associated with coupons dropped in the New York market and a second offer code associated with coupons dropped in the Baltimore market. If the operator enters only the New York market at the initialization step 152, then at the test step 159 the coupon will be deemed to not have more than one offer/campaign code. Alternatively, to process coupons for a merchant located between New York and Baltimore, the operator may choose to enter New York as the primary market and Baltimore as the secondary market at the step 152. In that case, during processing, the coupon will be deemed to have more than one offer/campaign code at the test step 159. Note that the number of market areas can be expanded as deemed necessary by the processor or at the request of a particular manufacturer.

If at the step 159 the coupon is deemed to have more than one offer/campaign code associated with it, then control passes from the test step 159 to a test step 160 to determine if the entire offer/campaign code and/or any associated secondary offer/campaign codes are contained entirely in the extended bar code, discussed above in connection with FIG. 3. If all of the information is not in the extended bar code, then control passes from the step 160 to a step 161 where the operator is prompted to enter the offer/campaign code and any secondary offer/campaign codes. Otherwise, if the information is contained entirely in the extended bar code, then control transfers from the step 160 to a step 162.

At the test step 162, the system 30 determines if the combination of the coupon U.P.C., the primary offer/campaign code, and any additional, secondary, offer/campaign codes are contained in the backfile 44. If so, then control transfers from the step 162 to the step 158 where the information for the coupon is stored. Otherwise, control transfers from the step 162 to the step 155 where the coupon record is flagged for later processing by supervisory personnel to add additional information to the record for the coupon U.P.C. Following the step 155 is the step 156 where the operator is prompted for information, such as the offer/campaign code and the expiration date, relating to the coupon.

Following the step 156 is the step 158 where the information for the coupon is stored. Following the step 158 is a test step 170 which determines if processing is complete. If so, then the processing terminates. Otherwise, control transfers from the step 170 back to the step 153 to scan another coupon.

The information that is stored at the step 158 includes the redemption data 46 and the marketing data 48 shown in FIG. 1. Storing the redemption data 46 is simply an accounting function where the face values of the coupons are totalled by retailing chain, store, manufacturer or by any other appropriate entity. Note that the manufacturer and value data is, in most cases, contained in the U.P.C. on the face of the coupon.

The marketing data 48 that is stored at the step 158 a count of the number of the various coupons, relevant offer/campaign codes thereof, and the alpha description associated with each coupon record. The alpha description is a universal way of describing manufacturers' products so that the different products, sizes, types, etc. can be compared, searched on, and extracted from the database. The alpha description includes a category which indicates the way the consumer would shop for the product by section (e.g., canned goods area, dairy department area, frozen foods area, etc.). The alpha description also includes a description of the way the consumer would think of the product (i.e., by type of product or brand name), the unit of measure of the product (e.g., pounds, ounces, etc.), the number of pounds or ounces of the product required for the coupon to be valid for use with the purchase, the number of products required for purchases as described on the face of the coupon, and the free goods description on the coupon such as one free with two or one free with five. The alpha description facilitates later database processing wherein the scanned coupons can be sorted by elements of the alpha description for marketing studies. Furthermore, the various offer/campaign codes that are entered for a coupon also facilitates marketing studies by allowing a manufacturer to determine the effectiveness of a particular coupon in various markets. Entering the alpha description in the backfile 44 is described in more detail hereinafter.

If at the step 151 the operator selects the console mode, then controls transfers from the step 151 to a step 180 where the operator selects either search coupon or add coupon. The console mode is used by supervisory personnel to enter information into the backfile 44. A search coupon option locates coupons that were flagged during line processing as needing additional information prior to being copied from the temporary file into the backfile 44. An add coupon option is for adding new coupons to the backfile 44.

If at the step 180 the operator selects the search coupon option, control transfers from the step 180 to a step 182 where the operator enters the lot identification information. At the step 182, the supervisor identifies the particular lot or run for which additional coupon information may be necessary. Note that during coupon line processing, the operator enters the lot information at the initialization step 152, described above.

Following the step 182 is a step 183 which determines if any coupons had been flagged during the line operation for the lot entered at the step 182. If not, then processing is complete. Otherwise, control passes from the step 183 to a step 184 where the operator is prompted to enter the missing information. The missing information includes the alpha description for the item on the face of the coupon. Following the step 184 is a step 185 where the record that was processed at the step 184 is unflagged. Unflagging the record at the step 185 indicates that all the necessary information for the record has been transferred from the temporary file and is now stored in the backfile 44. Following the step 185 is the step 183 where the system determines if any additional unflagged records remain in the lot.

If the operator selects the add option at the step 180, control transfers from the step 180 to a step 190 where the operator is prompted to enter initial data. Coupons can be added to the backfile 44 by examining newspaper inserts or any other source of coupon information including, but not limited to, information supplied directly by manufacturers.

Accordingly, at the step 190, the operator is prompted to enter the market code (i.e., the geographic area where the coupon insert is dropped), the source of the coupon insert (such as "VL" for Valassis inserts or "QD" for News America Quad Marketing), and the drop date of the coupon (i.e., the date of publication of the newspaper in which the coupon insert appears). Following the step 190 is a step 191 where the operator scans the coupon to determine the U.P.C. code and, if available, the extended bar code. Following the step 192 is a test step 193 where the system determines if the scanned coupon is a possible exact match of a coupon already stored in the backfile 44. An exact match occurs when scanned coupon matches the U.P.C. number, the offer/campaign codes and the expiration date of a coupon record already stored in the backfile 44.

If at the test step 193 the scanned coupon is deemed a possible exact match of a coupon already stored in the backfile 44, then control transfers from the step 193 to a step 194 where the coupon information is displayed on the screen and the operator is asked to verify that all of the information for the stored coupon record matches all of the information for the scanned coupon. If so, then control transfers from the step 194 back to the step 192 where the operator scans the next coupon.

If the coupon is not deemed to be a possible exact match at the step 193, or if the coupon is determined by the operator as not being an exact match at the step 194, then control transfers to a step 196 to test if the coupon is a near match. A scanned coupon is a near match to a coupon record in the backfile 44 if the information relating to the scanned coupon, including any offer/campaign codes found in the extended bar code, are nearly identical. Possible differences between a scanned coupon and a stored coupon record include a different expiration date, different offer/campaign codes, and different last two digits of the U.P.C. code (i.e., the amount on the face of the coupon).

If at the step 196 the coupon is deemed to be a near match, then control passes from the step 196 to a step 197 where the system 30 displays information for the coupons that are nearly identical to the scanned coupon. Following the step 197 or following the step 196 if the coupon is not a near match, the operator is prompted to enter data for the scanned coupon in order to complete the information in the backfile 44. Note that if the coupon is a near match, the operator can copy and edit the information displayed at the step 197, thus speeding processing by eliminating the time required to re-enter enter all of the information for the coupon. Following the step 198 is a test step 199 which determines if processing is complete. If processing is not complete, control transfers from the step 199 back to the step 192 in order to scan another coupon.

Referring to FIG. 7, a screen 210 is provided to the operator at the prompt step 161 of FIG. 6 to facilitate entry by the operator of the offer/campaign code. The screen 210 has a portion 212 showing the U.P.C. of the scanned coupon and a portion 213 showing the alpha description of the item. The screen 210 also has a column 214 showing various campaign codes, a column 216 showing various expiration dates, and a column 218 identifying each line of campaign codes from the column 214 and corresponding expiration dates from the column 216. The operator can select a particular offer/campaign code by entering a line number corresponding to either the offer/campaign code on the face of the coupon and/or the associated expiration date. If the offer/campaign code shown on the coupon is not found in the column 214, the operator can enter the new offer/campaign code and expiration date in the columns 214, 216. In that case, a new record corresponding to the new offer/campaign code is flagged for further processing by a supervisor, described above. Note that there is also a column 220 for secondary offer/campaign codes. This column contains any secondary offer/campaign codes associated with the offer/campaign codes of the column 214.

Referring to FIG. 8, a screen 230 is displayed when a operator has added a coupon to the database. The screen 230 includes an indication 232 of the U.P.C., alpha descriptors 233 that correspond to the product on the face of the coupon, a column 234 indicating drop areas of the coupon, a column 236 indicating the offer/campaign codes associated with the coupon, and a column 238 indicating the physical location of the offer/campaign code on the coupon. For the example shown on the screen 230, the location "2" indicates that the offer/campaign code is located above the U.P.C. code on the coupon. In addition, these location numbers can identify other coupon locations and/or corresponding type faces, fonts, or OCR type.

A prompt line 240 at the bottom of the screen 230 provides the operator with various options. The operator can add the displayed coupon to the database, edit the information on the screen, clear the information, or quit the program. Once the operator has verified that the information on the screen 230 is correct, the operator would add the record to the database by selecting the add option from the prompt line 240.

The screen 230 is similar to the screen that the operator sees at the step 194 and at the step 197 of FIG. 6. For both of the steps 194, 197, the system would display the coupon information which the operator would either verify as an exact match at the step 194 or would copy at the step 197 (in the case of a near match) and then edit the information at the step 198. The ability to copy and edit a near match simplifies the input processing by not requiring the operator to reenter information that is already stored in the backfile 44.

Although the invention has been illustrated herein using specific hardware (e.g., U.P.C. scanner 34, processor 38, etc.), it will be appreciated that the invention can be practiced using different hardware. Similarly, although the invention has been illustrated by scanning the U.P.C. of a coupon and determining offer/campaign codes thereof, it will be appreciated that the invention can be practiced using other types of coupon identifiers, such as the E.A.N. standard promulgated by the Uniform Coupon Council, and that it is even possible to practice the invention with coupon identifiers that do not use bar codes. The invention can be practiced without using any type of scanner or optical character reader by having the operator enter all of the coupon information manually.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. An automated coupon processing system for use with coupons having information printed thereon, the information including at least a first identifying code, said system comprising:

input means for inputting the information, including the first identifying code, from a coupon to said system, said input means including means for discerning the first identifying code from the input information;

data storage means for storing data corresponding to the first identifying codes of the coupons and data indicative of other coupon information;

processing means for processing the information input from the input means and the data in said storage means, said processing means including:

means for determining whether the first identifying code of a coupon is stored in said data storage means and has at least two second identifying codes associated therewith using data stored in said means for storing data; and means for identifying the second identifying codes associated with the first identifying code; and means for choosing a particular one of the second identifying codes, wherein the first identifying code and said particular one of the second identifying codes uniquely identify the coupon.

2. An automated coupon processing system, according to claim 1, wherein said means for choosing includes means for prompting an operator to select one of: a particular one of the second identifying codes and a coupon expiration date corresponding to a particular one of the second identifying codes.

3. An automated coupon processing system, according to claim 1, wherein said input means includes manual entry and at least one of: a bar code scanner, an optical character recognition scanner, and a combination bar code scanner/optical character recognition scanner.

4. An automated coupon processing system, according to claim 1, wherein the first identifying code forms at least a part of a bar code, and wherein said input means includes a bar code scanner.

5. An automated coupon processing system, according to claim 4, wherein the bar code is a U.P.C. code, and wherein said data storage means stores data indicating whether the second identifying codes appear as extended digits on the U.P.C. code.

6. An automated coupon processing system, according to claim 4, wherein the bar code is an E.A.N. code.

7. An automated coupon processing system, according to claim 4, wherein the bar code also includes the second identifying code, and wherein said data storage means stores data indicating that the second identifying code is included in the bar code.

8. An automated coupon processing system, according to claim 1, wherein in said data storage means, said data is indexed by the first identifying code.

9. An automated coupon processing system, according to claim 8, wherein in said data storage means, said data includes an alpha description of a product corresponding to the manufacturer coupon.

10. An automated coupon processing system, according to claim 1, wherein said processing means further comprises:

means for ascertaining coupon values from the first identifying code; and means for ascertaining marketing data from the second identifying code.

11. An automated coupon processing system, according to claim 10, wherein said processing means further comprises:

means for totaling coupon values; and means for accumulating marketing data.

12. An automated coupon processing system, according to claim 1, wherein the second identifying code is an offer/campaign code.

13. A method of processing coupons, comprising:

inputting to a processor information from a manufacturer coupon;

discerning a first identifying code from the information input to the processor from the coupon;

determining whether the first identifying code is included in records stored in a computer data file;

if the first identifying code is included in records stored in the computer data file, then determining whether two or more second identifying codes are associated with the first identifying code on the coupon; and if two or more second identifying codes are associated with the first identifying code, then performing the steps of:

identifying the second identifying codes associated with the first identifying code; and choosing a particular one of the second identifying codes, wherein the first identifying code and said particular one of the second identifying codes uniquely identify the coupon.

14. A method of processing coupons, according to claim 13, wherein said choosing step includes prompting an operator to select one of: a particular one of the second identifying codes and a coupon expiration date corresponding to a particular one of the second identifying codes.

15. A method of processing coupons, according to claim 13, wherein said inputting step includes using one of: a bar code scanner, an optical character recognition scanner, a combination bar code scanner/optical character recognition scanner, and manual entry.

16. A method of processing coupons, according to claim 13, wherein said discerning step includes reading the first identifying code on a face of the coupon and the second identifying code is on the face of the coupon.

17. A method of processing coupons, according to claim 16, wherein the first identifying code is a bar code.

18. A method of processing coupons, according to claim 17, wherein the bar code is a U.P.C. code.

19. A method of processing coupons, according to claim 17, wherein the bar code is an E.A.N. code.

20. A method of processing coupons, according to claim 17, wherein the bar code also includes information for selecting the second identifying code.

21. A method of processing coupons, according to claim 13, wherein the computer data file contains records indexed by the first identifying code, and wherein in said identifying step, the second identifying codes are identified by examination of the records associated with the first identifying code.

22. A method of processing coupons, according to claim 21, wherein said computer data file includes an alpha description of a product corresponding to the manufacturer coupon.

23. A method of processing coupons, according to claim 13, further comprising the steps of:

ascertaining coupon values from the first identifying code; and ascertaining marketing data from the second identifying code.

24. A method of processing coupons, according to claim 23, further comprising the steps of:

totaling coupon values; and accumulating marketing data.

25. A method of processing coupons, according to claim 13, wherein the second identifying code is an offer/campaign code.

26. A method of processing coupons, according to claim 13, said discerning step, said identifying step, and said choosing step include using a computer processor.

* * * * *